(12) United States Patent
Adachi

(10) Patent No.: US 7,752,469 B2
(45) Date of Patent: Jul. 6, 2010

(54) POWER ADAPTER INCLUDING PERIPHERAL UNIT CAPABLE OF SUPPLYING POWER FOR COMPUTER AND THE PERIPHERAL UNIT

(75) Inventor: Masaharu Adachi, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 850 days.

(21) Appl. No.: 11/523,235

(22) Filed: Sep. 19, 2006

(65) Prior Publication Data

US 2007/0067654 A1    Mar. 22, 2007

(30) Foreign Application Priority Data

Sep. 20, 2005    (JP)    ............... 2005-272066

(51) Int. Cl.
*G06F 1/26*    (2006.01)
(52) U.S. Cl. ........................ 713/300; 713/310
(58) Field of Classification Search .......... 713/300–340
See application file for complete search history.

(56) References Cited

U.S. PATENT DOCUMENTS 5,974,551 A * 10/1999 Lee ........................... 713/300
6,321,340 B1 * 11/2001 Shin et al. ..................... 713/310
2001/0032321 A1 * 10/2001 Nanno et al. ................. 713/300
2003/0156383 A1 * 8/2003 Jenkins et al. .............. 361/683
2007/0085516 A1 * 4/2007 Fenwick et al. ............. 323/234

FOREIGN PATENT DOCUMENTS

| JP | 8-33791 | 3/1996 |
|---|---|---|
| JP | 3046904 | 1/1998 |
| JP | 3101206 | 8/2000 |
| JP | 2000-277222 | 10/2000 |
| JP | 2003-332001 | 11/2003 |
| JP | 2004-288392 | 10/2004 |
| JP | 2004-304941 | 10/2004 |
| JP | 3661912 | 4/2005 |

* cited by examiner

*Primary Examiner*—Dennis M Butler
(74) *Attorney, Agent, or Firm*—Cooper & Dunham LLP

(57) ABSTRACT

This patent specification describes a power adapter which includes a power unit including a converter to supply power to a computer and a peripheral unit configured to communicate with the computer and to be controlled by the computer. Further, the power adapter includes a multiplexing-demultiplexing circuit configured to multiplex and demultiplex a power signal with a data or control signal.

15 Claims, 15 Drawing Sheets

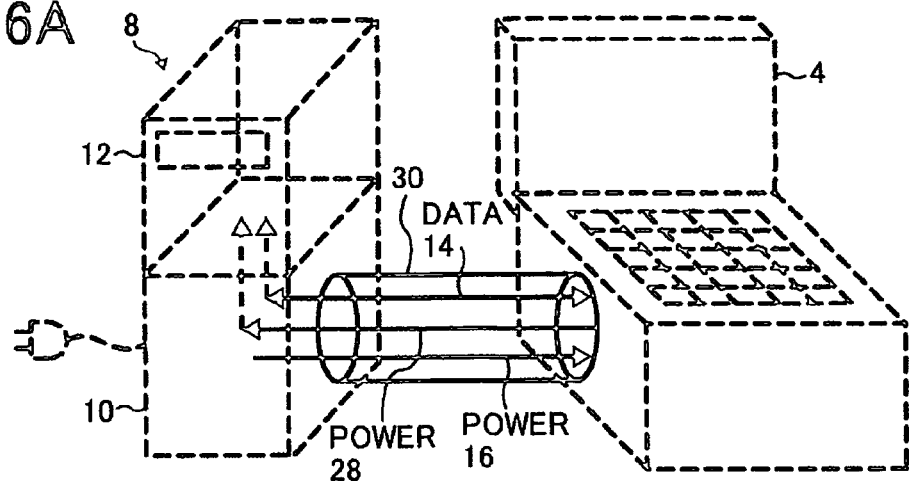
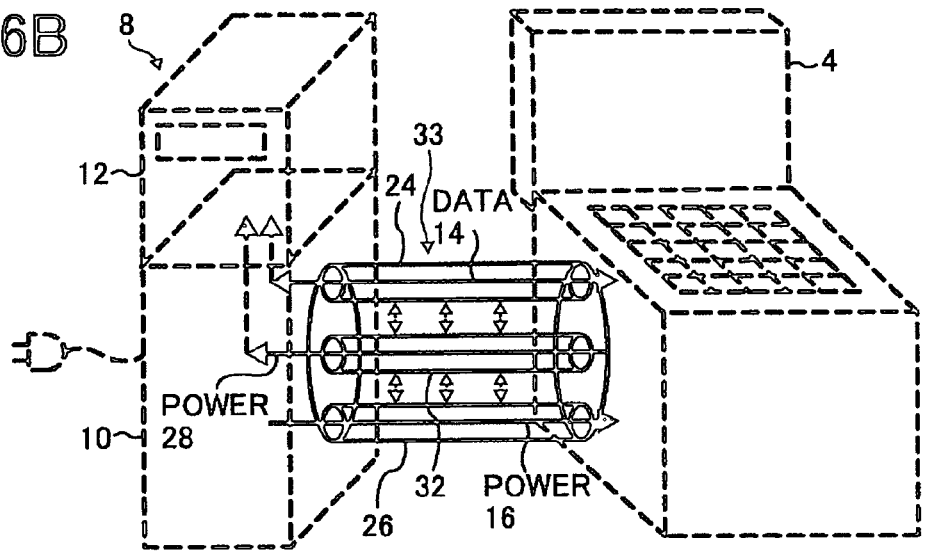
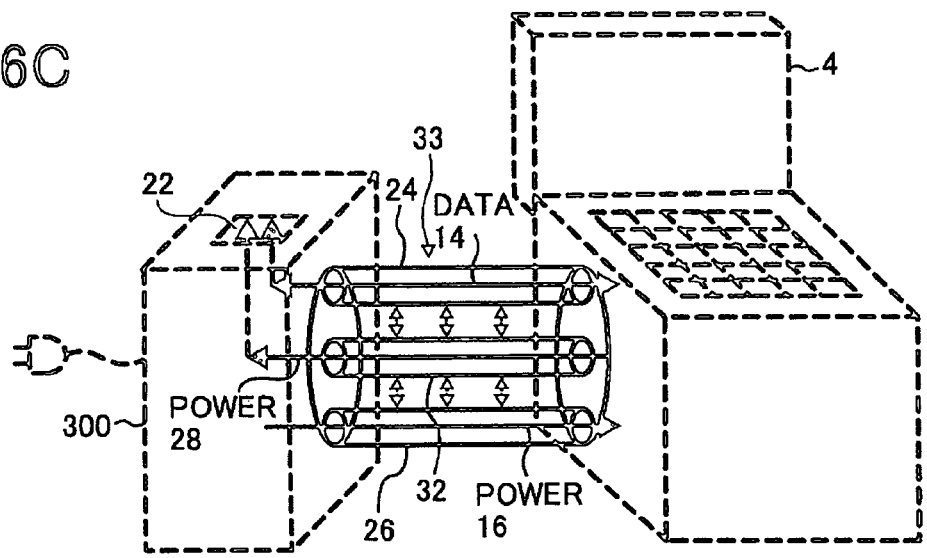

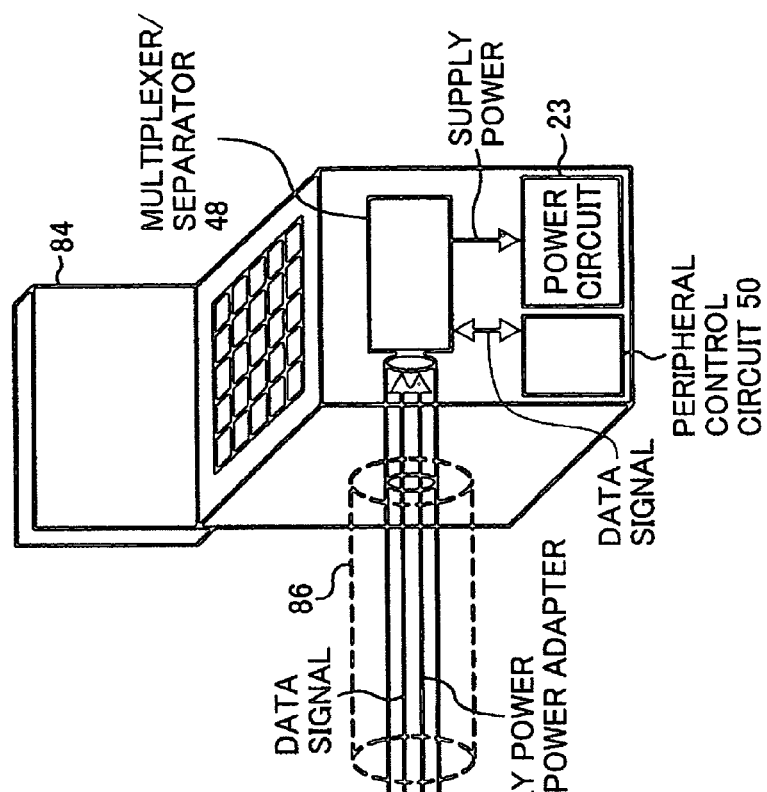
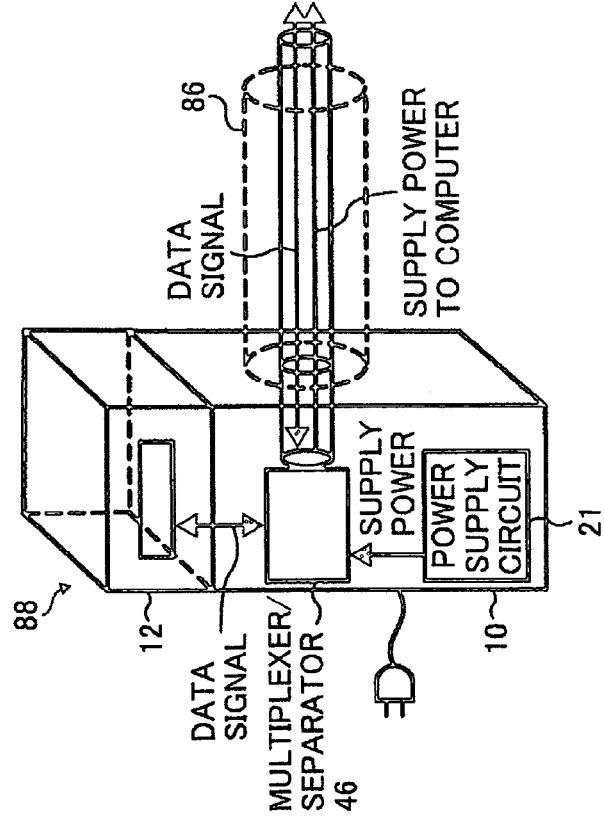

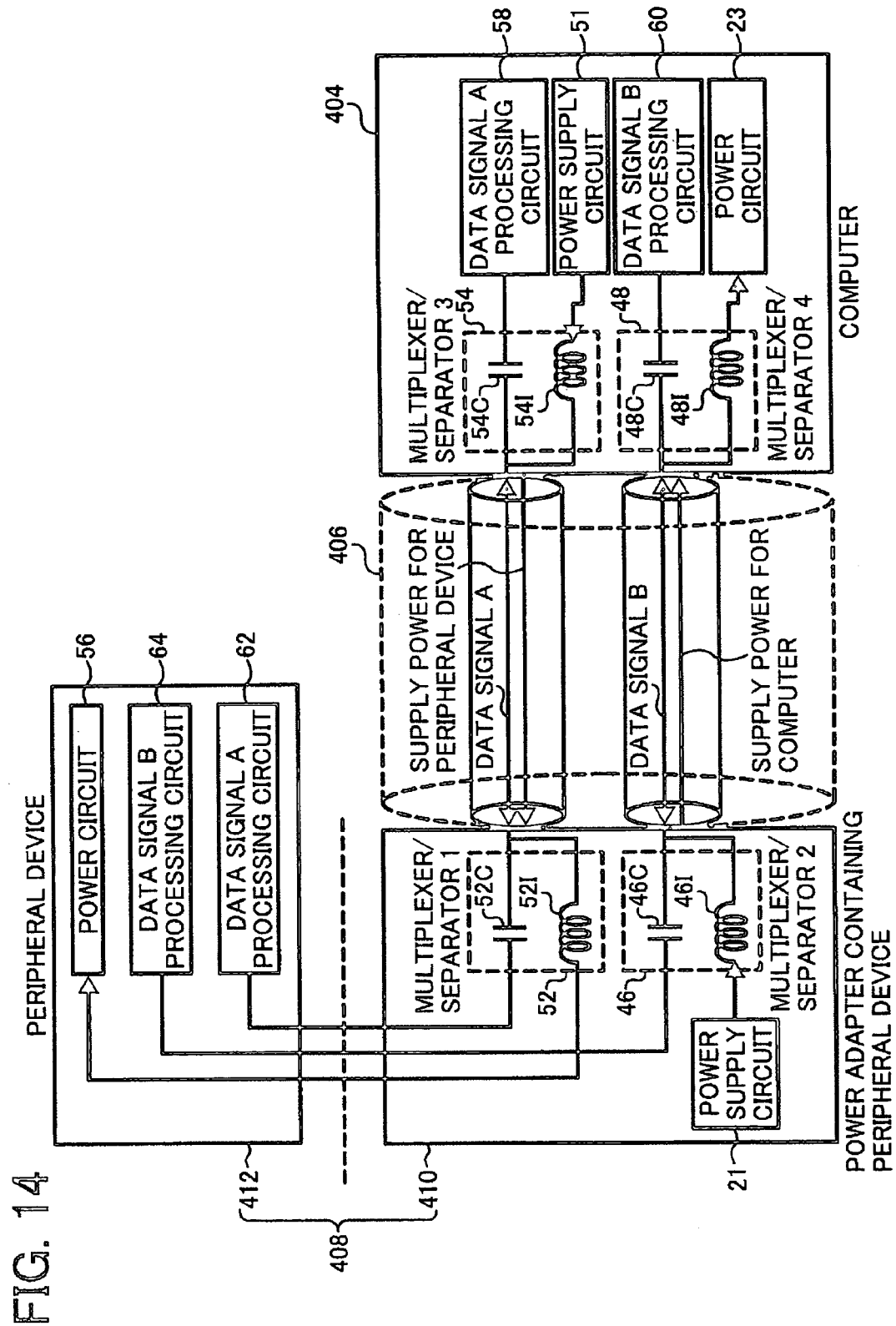

POWER ADAPTER INCLUDING PERIPHERAL UNIT CAPABLE OF SUPPLYING POWER FOR COMPUTER AND THE PERIPHERAL UNIT

FIELD

This patent specification describes a power adapter including peripheral unit capable of supplying power for computer and the peripheral unit.

BACKGROUND

A power adapter is widely used as a power supplier for compact desktop PCs (personal computer), notebook PCs and personal information equipment. The power adapter is generally prepared only to supply power to the PCs and equipments. However, a performance of the power adapter is relatively low whereas the power adapter has a large volume and is heavy.

FIG. 1 illustrates a conventional compact computer system. The compact computer system includes a power adapter 110, a computer 104 and a cable 116. The cable 116 connects the power adapter 110 to the computer 104 so as to supply power to the computer 104. A cable 114 may be employed separately from the cable 116 to connect the computer 104 to a peripheral device 112. If the peripheral device 112 is a high power device, a separate power adapter may be employed to supply a necessary power to the peripheral device 112.

A variety of adapters including a peripheral circuit have been disclosed. One example is an USB (universal serial bus) hub adapter. In the USB hub adapter, a power is supplied simply to work an USB hub circuit included in the USB hub adapter. Similarly, in a network adapter, a power is supplied simply to work the network circuit. In a LAN (local area network) adapter, a power is supplied simply to work the LAN circuit. In an interface apparatus of an uninterruptible power source, a power is supplied simply to work an interface circuit. Further, the interface apparatus does not have a converting function on a frequency and a voltage of the power being supplied. Thus, those adaptors do not supply power to the computer but only to the circuit mounted on the adapters.

SUMMARY

This patent specification describes a novel power adapter which includes a power unit including a converter to supply power to a computer and a peripheral unit configured to communicate with the computer and to be controlled by the computer.

This patent specification further describes a novel cable which includes a power line configured to supply a power from a power adapter to a computer and a transmission line integrated with the power line and configured to communicate between the computer and a peripheral unit arranged at the power adapter.

Further, this patent specification describes a novel computer system which includes a computer, a power adapter including a power unit configured to supply power and a peripheral unit configured to communicate with the computer and to be controlled by the computer and a cable including a power line to supply power and a transmission line to transmit data.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 6A through 6C illustrate oblique perspective schematic views of cables according to a third exemplary embodiment;

FIG. 12A illustrates schematically a power adapter which includes a multiplexing-demultiplexing circuit;

FIG. 12B illustrates schematically a computer which includes a multiplexing-demultiplexing circuit;

FIG. 14 illustrates a block diagram of an example of a compact computer system;

DETAILED DESCRIPTION OF PREFERRED EMBODIMENTS

Figure 1:
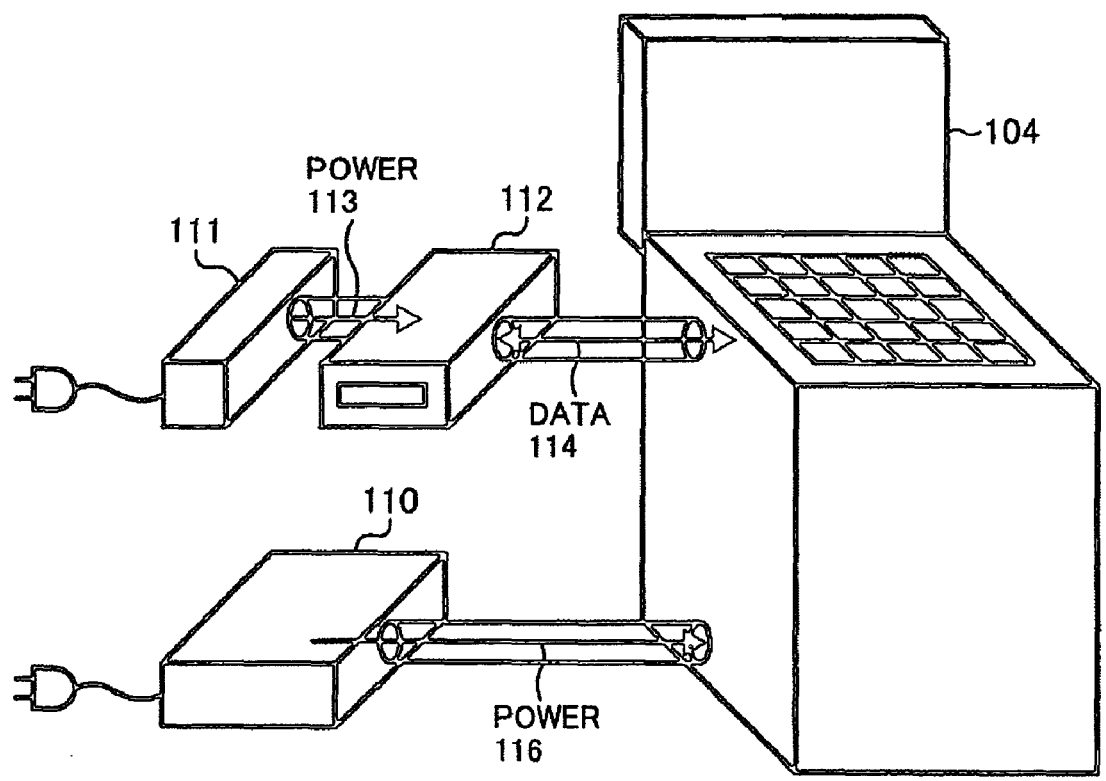
FIG. 1 illustrates schematically a conventional compact computer system.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 2A, a power adapter according to an exemplary embodiments is described.

Figure 2A:
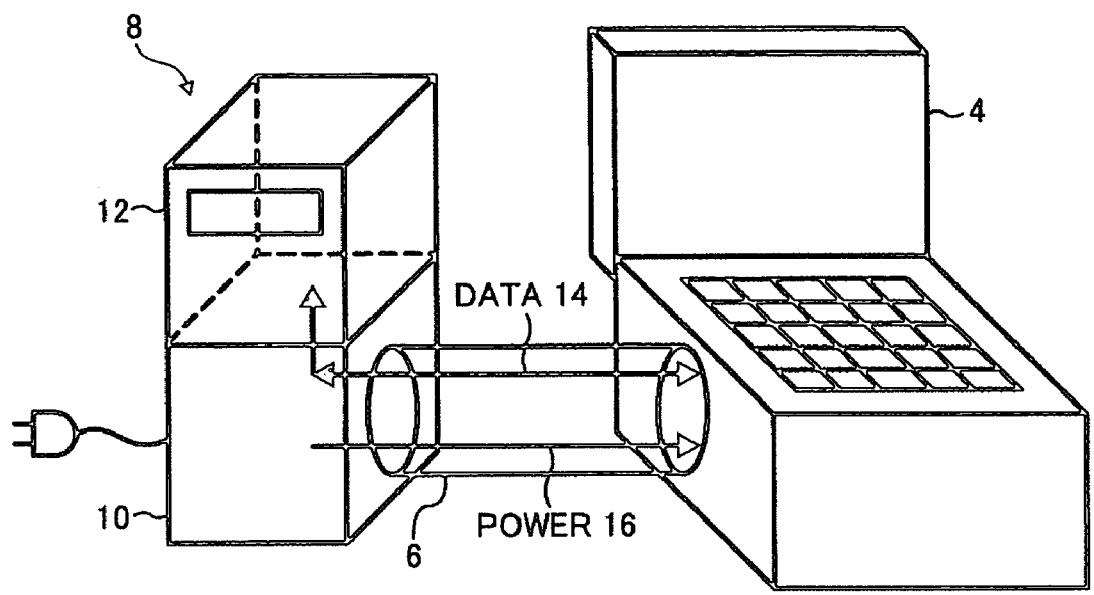
FIG. 2A illustrates an oblique perspective schematic view of a compact computer system according to a first exemplary embodiment of the present disclosure.

FIG. 2A illustrates an oblique perspective schematic view of an example of a compact computer system which includes a power adapter 8, a computer 4 and a cable 6, according to a first exemplary embodiment of the present disclosure. The power adapter 8 includes a power unit 10 and a peripheral unit 12 therein. The cable 6 connects the power adapter 8 to the computer 4. The power unit 10 includes a main power input line and a power converter (not shown).

The power converter converts a power input from the main power input line to a necessary power. The power unit 10 supplies the power to the computer 4 similarly to a conventional power adapter (AC adapter). Meanwhile, the peripheral unit 12 works as a part of the computer 4 and performs a peripheral function, for example, an USB (universal serial bus) connecting function.

The power adapter 8 is connected to the computer 4 using only one cable in the first exemplary embodiment. Namely, power is supplied to the computer 4 from the power adapter 8 through the cable 6. Moreover, digital data is transmitted between the peripheral unit 12 and the computer 4 through the cable 6.

The computer 4 includes a peripheral controller (not shown) and a power input circuit (not shown). The peripheral controller controls data transmission with the peripheral unit 12 which is included in the power adapter 8. The power unit 10 and the peripheral unit 12 can be integrated into one device as shown in FIG. 2A so that the total system can be made smaller and more lightweight.

Figure 2B:
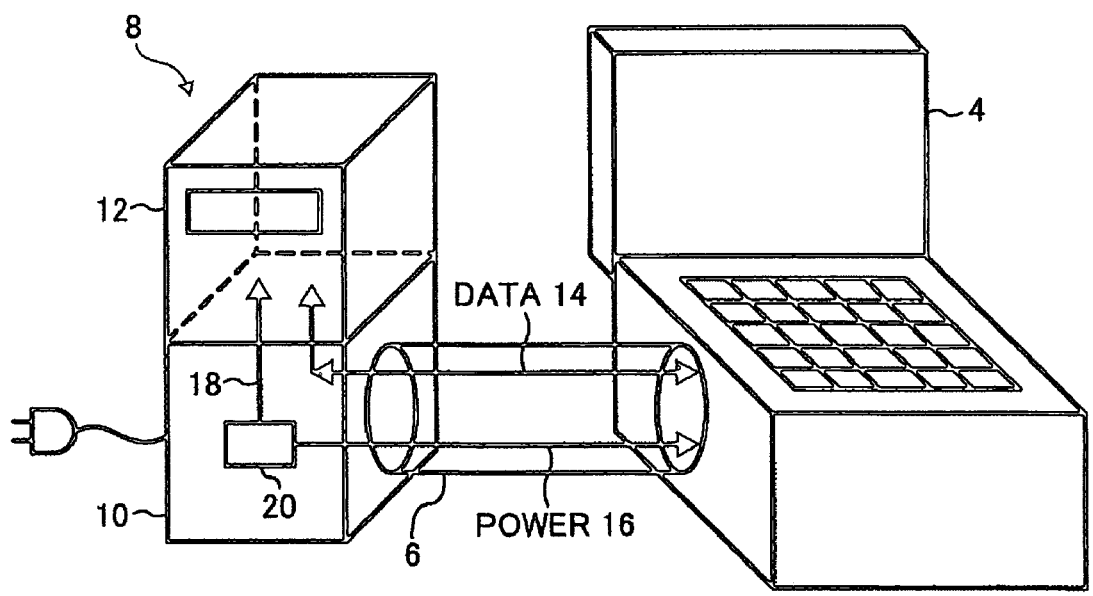
FIGS. 2B, 3A, 3B and 4 illustrate oblique perspective schematic views of additional examples of a compact computer system according to the first exemplary embodiment.

FIG. 2B illustrates another example of a compact computer system wherein a different power from the power for the computer 4 is supplied to the peripheral unit 12. In this example, a power branch unit 20 is arranged in the power unit 10 of the power adapter 8. Power is supplied to the computer 4 and power is also supplied to the peripheral unit 12, in each instance, from the power branch unit 20. The power output from the power branch unit 20 is not necessary to be equal but can be different kinds of powers, for example, with a different voltage and a different frequency.

Figure 3A:
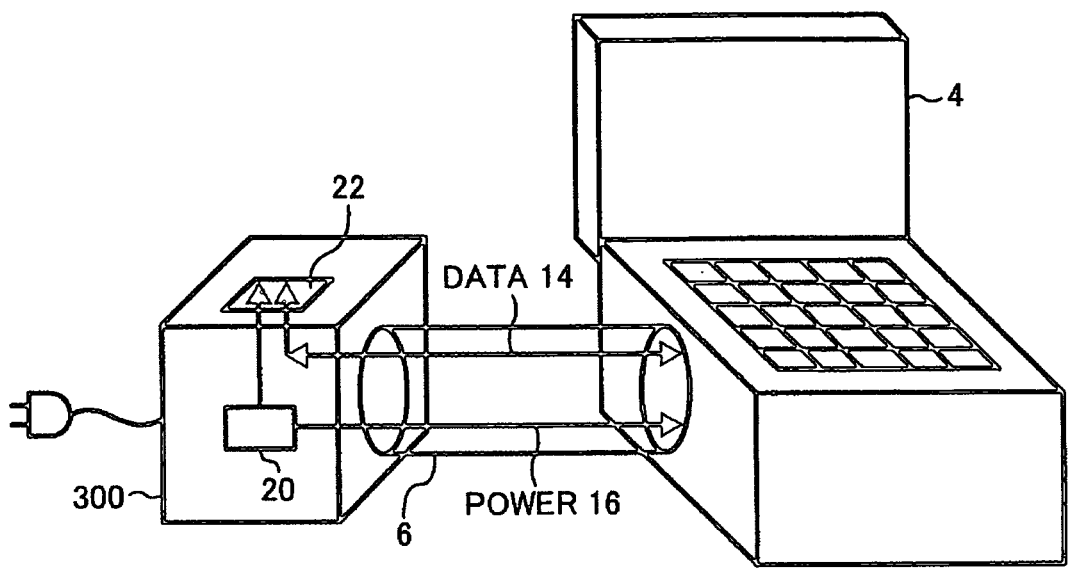
Figure 3B:
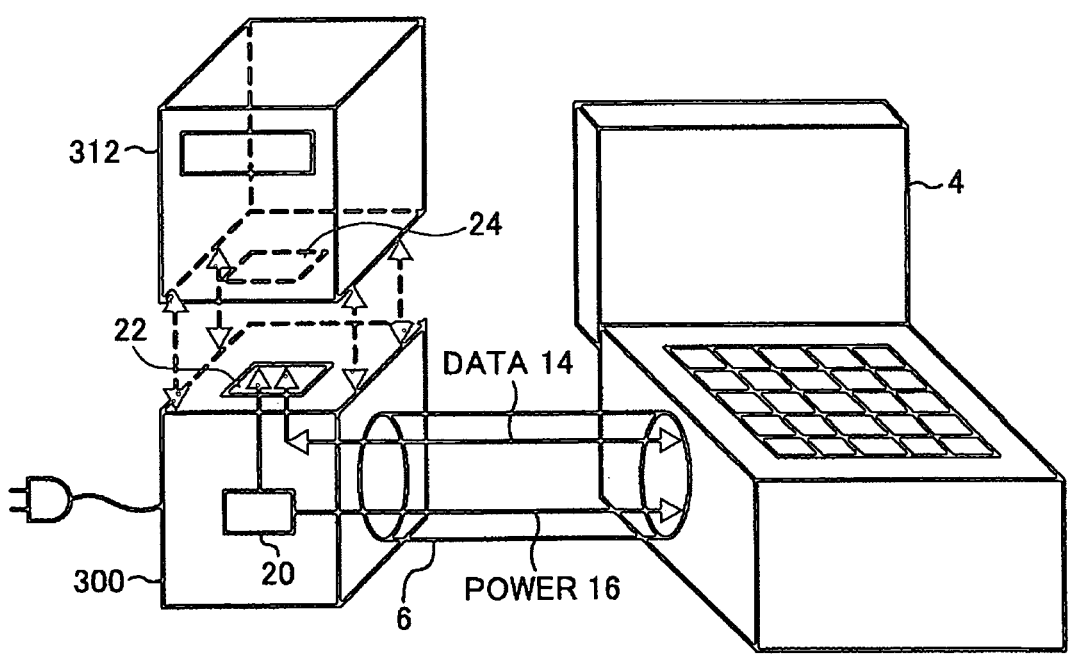

FIGS. 3A and 3B illustrate respective oblique perspective schematic views of additional examples of a compact computer system which includes a power unit 300, a computer 4 and a cable 6. The power unit 300 supplies power to the computer 4 through the cable 6, similar to a conventional power adapter. Further, the power unit 300 includes a peripheral connecting connector 22.

In FIG. 3B, a peripheral unit 312 can be connected to the power unit 300 via the peripheral connecting connector 22. The cable 6 includes a power line 16 and a data transmission line 14, and the data transmission line is extended to the peripheral connecting connector 22 so that the peripheral unit 312 can communicate with the computer 4. The peripheral connecting connector 22 is connected to a power branch unit 20 arranged in the power unit 300 so that the power is supplied to the peripheral unit 312 from the power unit 300 via the peripheral connecting connector 22.

Figure 4:
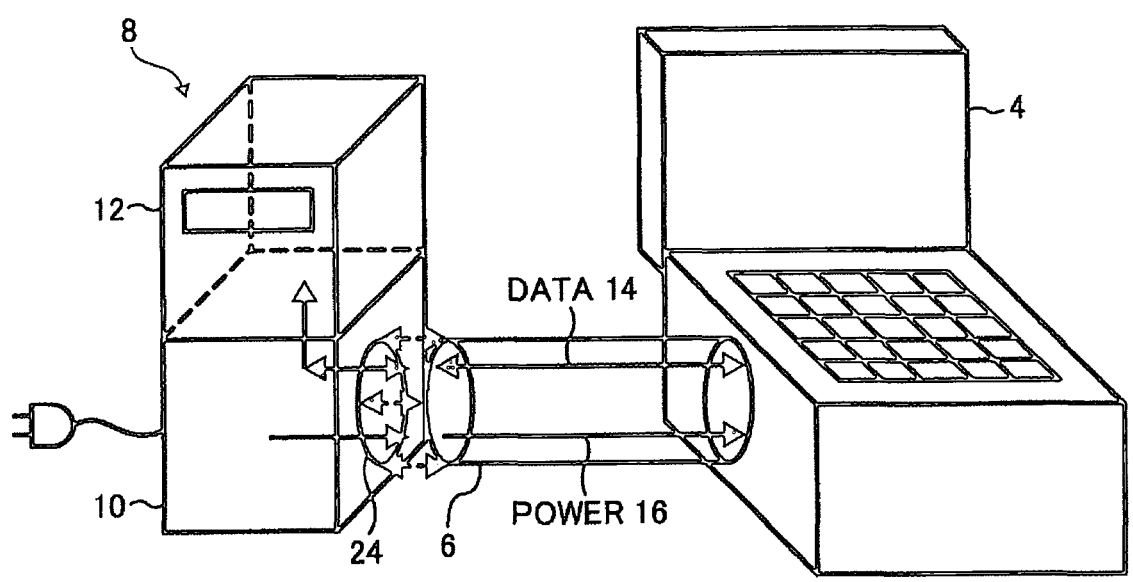

FIG. 4 illustrates an oblique perspective schematic view of another example of a compact computer system according to a first exemplary embodiment of the present disclosure. The cable 6 is detachably arranged with the power adapter 8. Namely, the cable 6, in which the power supply line 16 and the data transmission line 14 is integrated, can be detached from the computer 4 and the power adapter 8. As a result, a variety of cables are applicable. If a peripheral function is not needed, a data transmission line may not be necessary. A cable which includes a power supply line only may be employed.

Figure 5A:
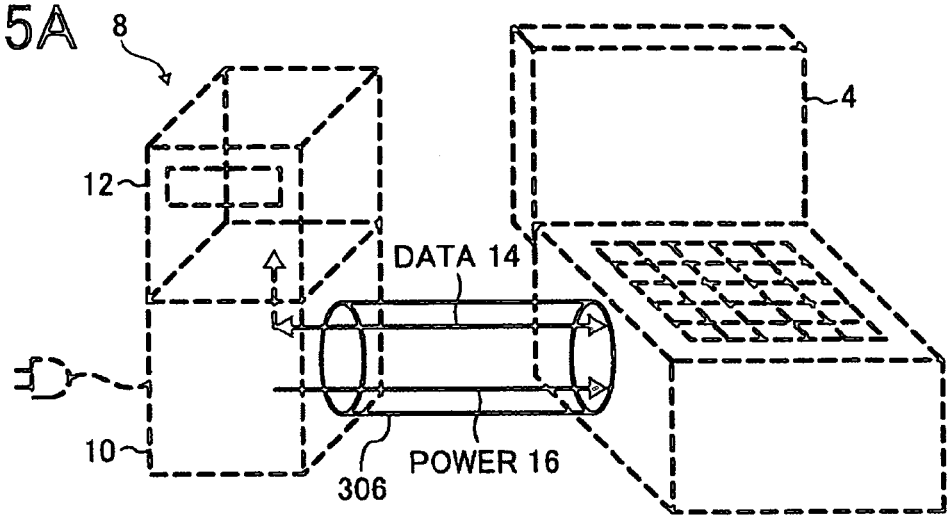
FIGS. 5A through 5C illustrate oblique perspective schematic views of cables according to a second exemplary embodiment.
Figure 5B:
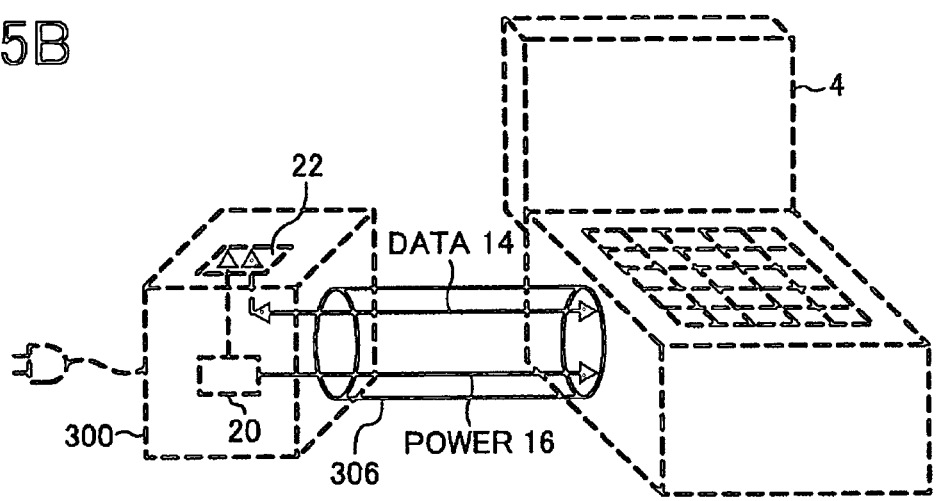
Figure 5C:
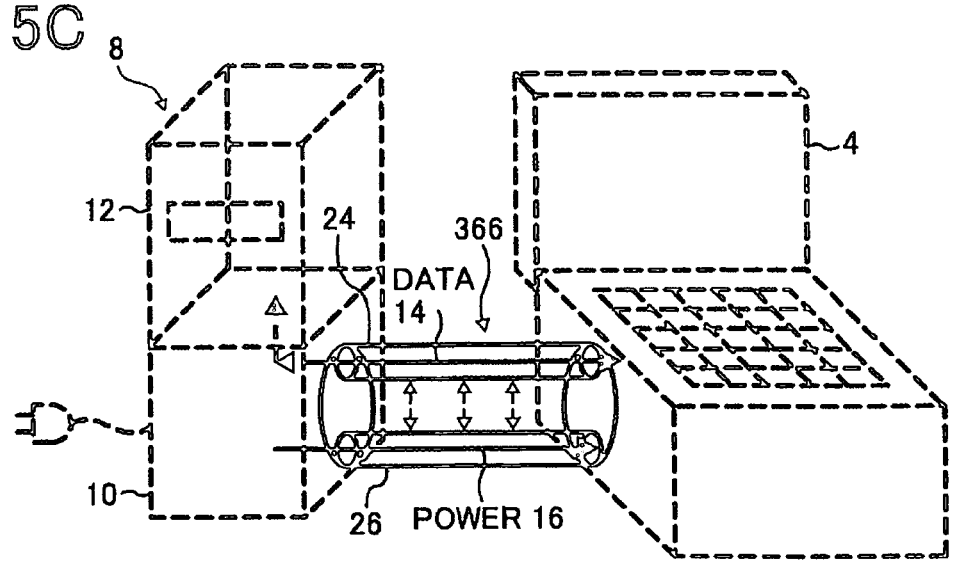

FIGS. 5A through 5C illustrate oblique perspective schematic views of cables 306 and 366, according to a second exemplary embodiment of the present disclosure. The cables 306 and 366 connect the power adapter 8 or the power unit 300 to the computer 4. In FIGS. 5A through 5C, the power adapter 8, the power unit 300 and the computer 4 are shown by dashed lines.

The cable 306 in FIG. 5A includes a power supply line 16 and a data transmission line 14. The two lines 14 and 16 are integrated. The power supply line 16 connects the power unit 10 to the computer 4 and the data transmission line 14 transmits transmission data between a peripheral unit 12 and the computer 4. The cable 306 in FIG. 5A is a single cable so as to contribute to obtain a compact system which is lightweight.

The cable 306 in FIG. 5B includes a power supply line 16 and a data transmission line 14. The two lines are integrated. The power supply line 16 connects the power unit 300 having a peripheral connecting connector 22 to the computer 4. The data transmission line 14 transmits transmission data between the peripheral connecting connector 22 and the computer 4. The cable 306 in FIG. 5B is also a single cable so as to contribute to make the system compact and lightweight.

The cable 366 of FIG. 5C includes a power pipe 26 and a data pipe 24. The power pipe 26 includes a power supply line 16 which supplies power from the power unit 10 to the computer 4. The data pipe 24 includes a data transmission line 14 which transmits signals between the computer 4 and the peripheral unit 12. The data pipe 24 and the power pipe 26 are integrated and are detachably included in the cable 366.

If only the power unit 10 is used, the data pipe 24 may be detached so as to make the cable 366 compact and lightweight. If only the peripheral unit 12 is used, the power pipe 26 may be detached so as to make the cable 366 compact and lightweight. Further, the peripheral unit 12 may be used as a part of another computer system by separating the data pipe 24 and the power pipe 26.

FIGS. 6A through 6C illustrate oblique perspective schematic views of cables 30 and 33, according to a third exemplary embodiment of the present disclosure. The cables 30 and 33 connect a power adapter 8 or a power unit 300 to the computer 4. In FIGS. 6A through 6C, the power adapter 8, the power unit 300 and the computer 4 are shown by dashed lines.

The cable 30 in FIG. 6A includes a power supply line 16 and a data transmission line 14, similar to the examples shown in FIGS. 2A and 2B. The two lines are integrated. The power supply line 16 connects the power unit 10 to the computer 4 and the data transmission line 14 transmits transmission data between the peripheral unit 12 and the computer 4. In the example of FIG. 2B, the peripheral unit 12 of the power adapter 8 receives a different power from the power to the computer 4 and the power to the peripheral unit is supplied from the power unit 10 through the power branch unit 20. However, in the example of FIG. 6A, the power for the peripheral unit 12 is supplied from the computer 4.

The data transmission line 14, a first power line 16 and a second power line 28 are integrated in the cable 30. The cable 30 in FIG. 6A is a single cable so as to contribute to make a small, lightweight, system similar to the cable 6 shown in FIG. 5A.

The cable 33 in FIG. 6B includes a first power pipe 26, a data pipe 24 and a second power pipe 32. The first power pipe 26, the data pipe 24 and the second power pipe 32 are integrated and are configured to be detachable from the cable 33. The first power pipe 26 includes a first power supply line 16 which supplies a first power from the power unit 10 to the computer 4. The data pipe 24 includes a data transmission line 14 which transmits signals between the peripheral unit 12 and the computer 4. The second power pipe 32 includes a second power supply line 28 which supplies a second power from the computer 4 to the peripheral unit 12.

If only the power unit 10 of the power adapter 8 is used, the data pipe 24 and the second power pipe 32 may be detached so as to make the cable 33 compact and lightweight. If only the peripheral unit 12 of the power adapter 8 is used, the power pipe 26 may be detached so as to make the cable 30 compact and lightweight. Further, the peripheral unit 12 may be used as a part of another computer system by separating the data pipe 24, the first and second power pipes 26 and 32. As shown in FIG. 6C, if the power adapter does not include a peripheral unit and is used only as a power supplier, the data pipe 24 and the second power pipe 32 may be detached so as to make the cable 33 compact and lightweight.

FIGS. 7A to 9B illustrate oblique perspective schematic views of cable-output connectors 34, 36 and 42 and cable-input connectors 38, 40 and 44 according to a fourth exemplary embodiment of the present disclosure. The cable-output connectors 34, 36 and 42 are arranged at an end of the cable. The cable-input connectors 38, 40 and 44 are arranged at a sidewall of the computer 4. The cable is connected to the computer 4 with the cable-output connectors 34, 36 and 42 and the cable-input connectors 38, 40 and 44. In FIGS. 7A to 9B, the connectors are shown with solid line, and the power adapter 8, the power unit 10, the computer 4 and the cables are shown by dashed line.

Figure 7A:
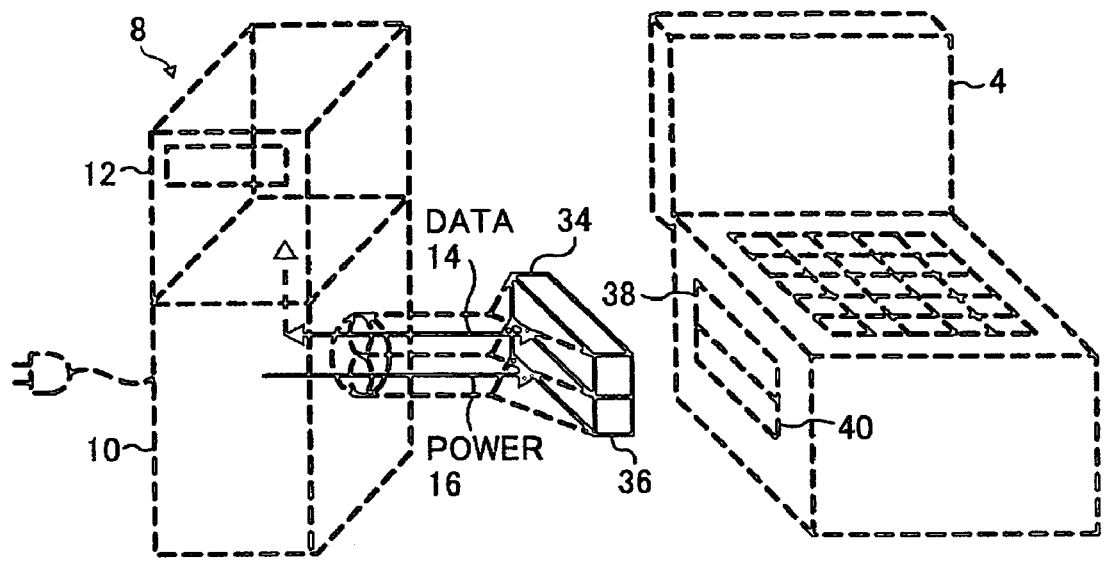
FIGS. 7A through 9B illustrate oblique perspective schematic views of cable-output connectors and cable-input connectors according to a fourth exemplary embodiment.
Figure 9A:
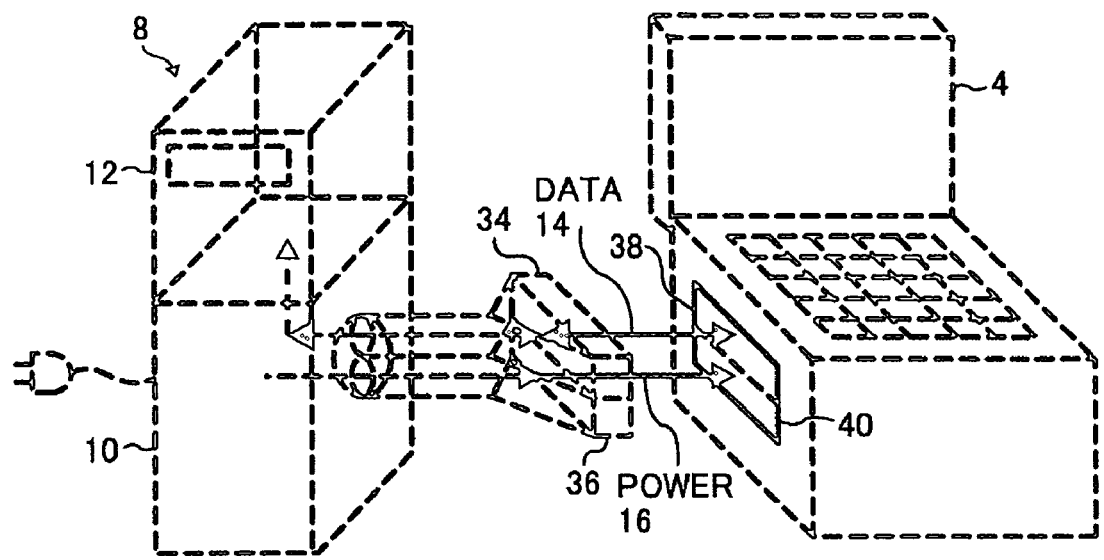

FIG. 7A illustrates a data transmission connector 34 and a power connector 36 which are the cable-input connectors and are integrated. The data transmission connector 34 connects the data transmission line 14 to the computer 4 and the power connector 36 connects the power line 16 to the computer 4. FIG. 9A illustrates a data input/output connector 38 and a power input connector 40 which are the cable-input connectors and are integrated. The data input/output connector 38 and the power input connector 40 are arranged at a sidewall of the computer 4. The data transmission connector 34 and the power connector 36 are connected to the data input/output connector 38 and the power input connector 40 respectively.

The data transmission connector 34 and the power connector 36 are integrated so as to make the cable, the power adapter and the computer compact and lightweight. Similarly, the data input/output connector 38 and the power input connector 40 are integrated so as to make the cable and the computer compact and lightweight.

Figure 8A:
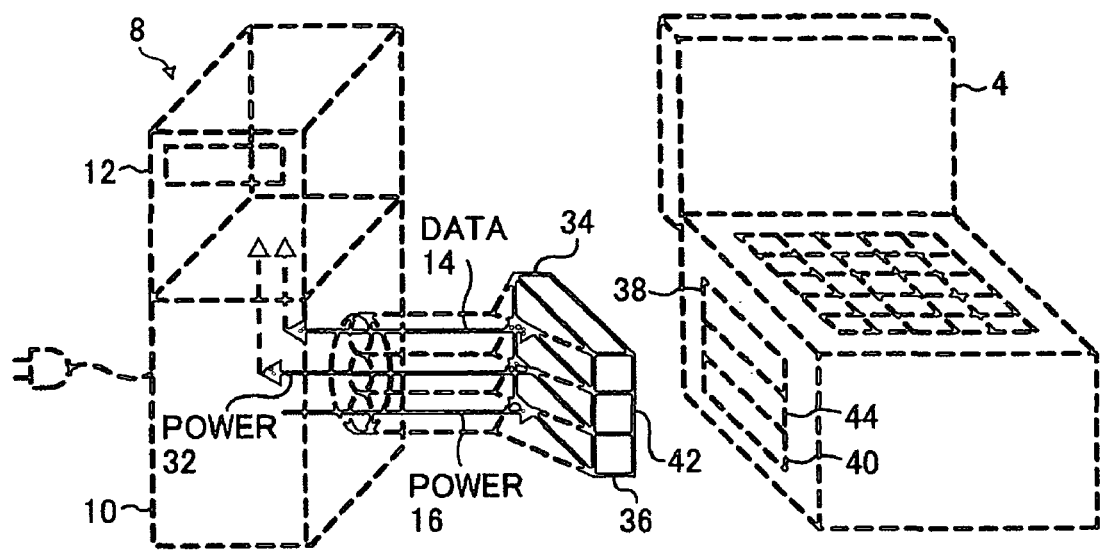
Figure 9B:
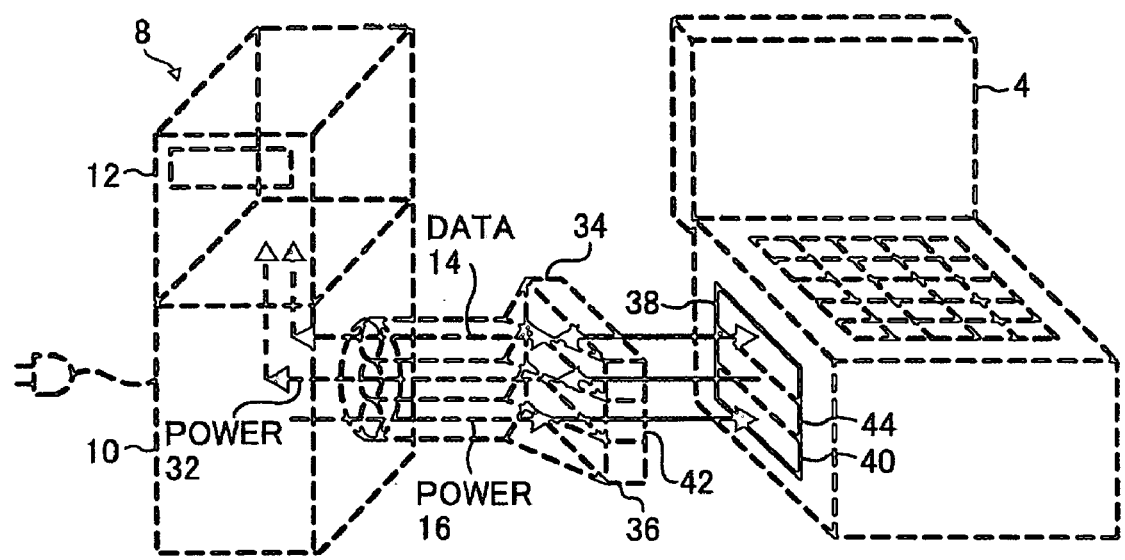

FIG. 8A illustrates a data transmission connector 34, a power connector 36 and a peripheral-power-supply connector 42 which are the cable-input connectors and are integrated. The peripheral-power-supply connector 42 connects the power line 28 to the computer 4. The computer 4 supplies the power to the peripheral unit 12 through the peripheral-power-supply connector 42. FIG. 9B illustrates the data input/output connector 38, the power input connector 40 and a peripheral-power-output connector 44 which are the cable-input connectors and are integrated. The peripheral-power-output connector 44 is arranged at a sidewall of the computer 4 and is connected to the peripheral-power-supply connector 42.

The data transmission connector 34, the power connector 36 and the peripheral-power-supply connector 42 are integrated so as to make the cable, the peripheral unit, the power adapter and the computer compact and lightweight. Similarly, the data input/output connector 38, the power input connector 40 and the peripheral-power-output connector 44 are integrated so as to make the cable and the computer compact and lightweight.

Figure 7B:
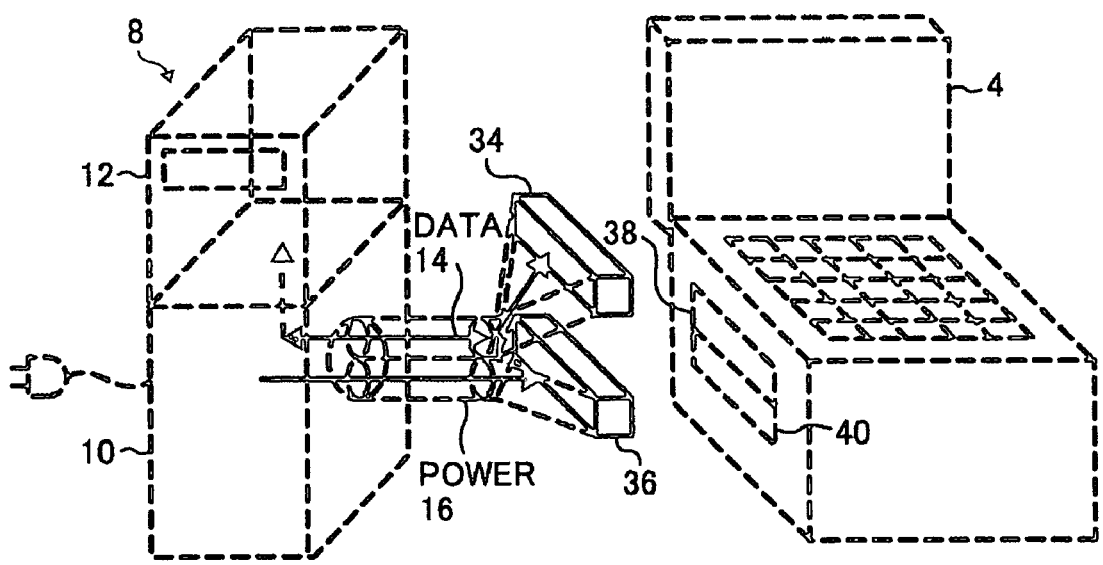
Figure 8B:
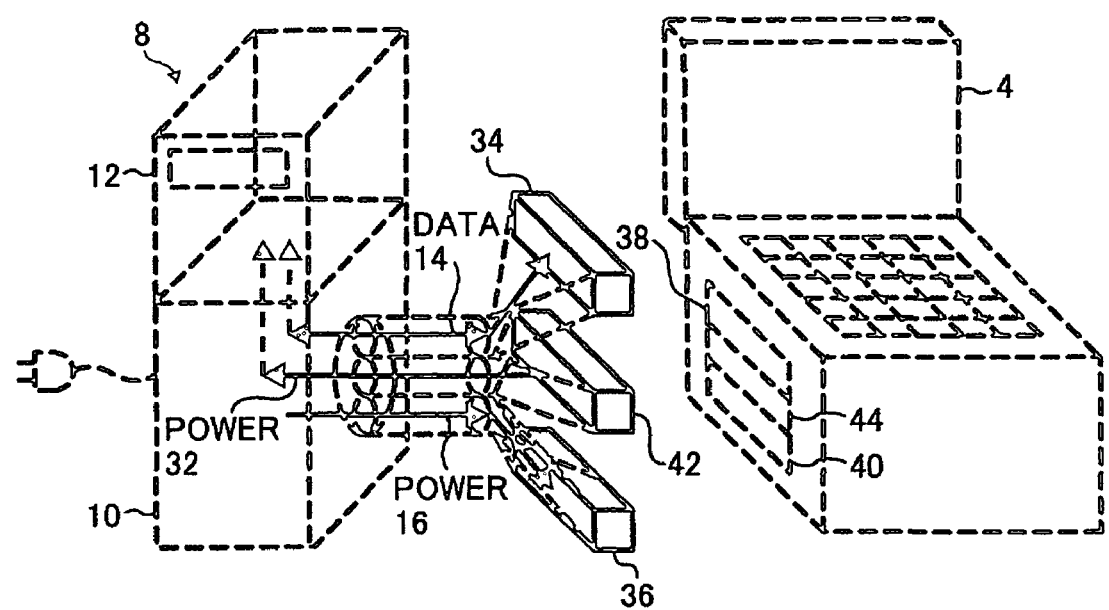

FIG. 7B illustrates the data transmission connector 34 and the power connector 36 which are configured to be detached from each other. It is a difference from the connectors of FIG. 7A. Further, FIG. 8B illustrates the data transmission connector 34, the power connector 36 and the peripheral-power-supply connector 42 which are configured to be detached from each other. It is a difference from the connectors of FIG. 8A. Advantages to form the data transmission connector 34 and the power connector 36 detachable as shown in FIG. 7B will be described.

If the computer 4 needs a function of a power adapter only, the data transmission connector 34 may be detached so as to make a connection mechanism between the cable and the computer 4 compact and lightweight. By removing the data transmission connector 34, the power adapter 8 may be used simply as a power adapter and may be connected to another computer. Further, the power adapter 8 can be applied to a computer which has a power input connector only.

If the computer 4 needs a functionality of a peripheral device, the power connector 36 may be detached so as to make a connection mechanism between the cable and the computer 4 compact and lightweight. By removing the power connector 36, the peripheral unit may be simply used as a peripheral unit and may be connected to another computer independently. Further, the peripheral unit can be connected to a computer which has a peripheral input connector only.

Advantages that the data transmission connector 34, the power connector 36 and the peripheral-power-supply connector 42 are formed to be detachable as shown in FIG. 8B will be described.

If the computer 4 needs a functionality of a power adapter only, the data transmission connector 34 and the peripheral-power-supply connector 42 may be detached so as to make a connection mechanism between the cable and the computer 4 compact and lightweight. By removing the data transmission connector 34 and the peripheral-power-supply connector 42, the power adapter 8 may be simply used as a power adapter. Further, the power adapter 8 can be applied to a computer which has a power input connector only.

If the computer 4 needs a functionality of a peripheral unit only, the power connector 36 may be detached so as to make the connection mechanism between the cable and the computer 4 compact and lightweight. The peripheral unit 12 can work with the power supplied by the computer 4. By removing the power connector 36, the peripheral unit 12 may be used simply as a peripheral unit and may be connected to an other computer independently. Further, the peripheral unit can be connected to a computer which has a peripheral input connector only.

Figure 10:
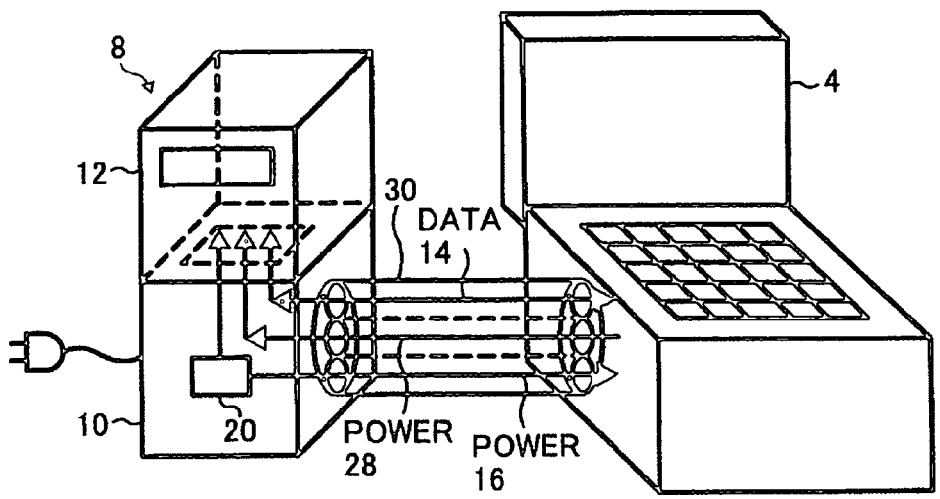
FIG. 10 illustrates an oblique perspective schematic view of a compact computer system according to a fifth exemplary embodiment.

FIG. 10 illustrates an oblique perspective schematic view of a power adapter 8, a cable 33 and a computer 4 according to a fifth exemplary embodiment of the present disclosure. The cable 33 may be the similar cable of the third exemplary embodiment as shown in FIG. 6B. The power adapter 8 includes a power unit 300 and a peripheral unit 12 which are integrated. The power unit 300 includes a branch unit 20. Moreover, the cable 30 shown in FIG. 6B may be employed.

Some examples of power adapters having a peripheral unit according to the present disclosure are as follows:

[1] A power adapter having an USB hub or an USB extension connector (with no controller);

[2] A power adapter having an Ethernet hub (IEEE 802.3) or an Ethernet extension connector (with no controller);

[3] A power adapter having an IEEE 1394 hub or an IEEE 1394 extension connector (with no controller);

[4] A power adapter having a magnetic hard disk drive (HDD), or a magnetic floppy disk drive (FDD), an optical media drive (CD-ROM/CD-RW/DVD-ROM etc.);

[5] A power adapter having a media card reader to read any of various media, for example, SD card, multimedia card, memory-stick, smart-media, smart-card, xD picture-card, compact-flash, ATA-interface PC card and micro-drive;

[6] A power adapter having a controller using serial ATA interface;

[7] A power adapter having a controller using PCI (peripheral component interface) Express interface;

[8] A power adapter having a controller using serial (RS-232C) interface; and

[9] A power adapter having a controller using parallel (printer, IEEE (institute of electrical and electronics engineers) 1284) interface.

Some examples of cables in which a data transmission line and power supply lines are integrated are as follows:

[10] A power supply line to the computer integrated with an USB interface data transmission line;

[11] A power supply line to the computer integrated with an USB interface data transmission line and a power supply line to an USB peripheral unit;

[12] A power supply line to the computer integrated with an IEEE 1394 interface data transmission line;

[13] A power supply line to the computer integrated with an IEEE 1394 interface data transmission line and a power supply line to an IEEE 1394 peripheral unit;

[14] A power supply line to the computer integrated with an ATA interface data transmission line;

[15] A power supply line to the computer integrated with an ATA interface data transmission line and a power supply line to an ATA peripheral unit;

[16] A power supply line to the computer integrated with a PCI Express interface data transmission line;

[17] A power supply line to the computer integrated with a PCI Express interface data transmission line and a power supply line to a PCI Express peripheral unit;

[18] A power supply line to the computer integrated with a serial (RS-232C) interface data transmission line;

[19] A power supply line to the computer integrated with a serial (RS-232C) interface data transmission line and a power supply line to a serial (RS-232C) peripheral unit;

[20] A power supply line to the computer integrated with a parallel (printer, IEEE 1284) interface data transmission line;

[21] A power supply line to the computer integrated with a parallel (printer, IEEE 1284) interface data transmission line and a power supply line to a parallel (printer, IEEE 1284) peripheral unit;

[22] A power supply line to the computer integrated with an Ethernet (IEEE 802.3) interface data transmission line; and

[23] A power supply line to the computer integrated with an Ethernet (IEEE 802.3) interface data transmission line and a power supply line to an Ethernet (IEEE 802.3) peripheral unit.

Figure 11:
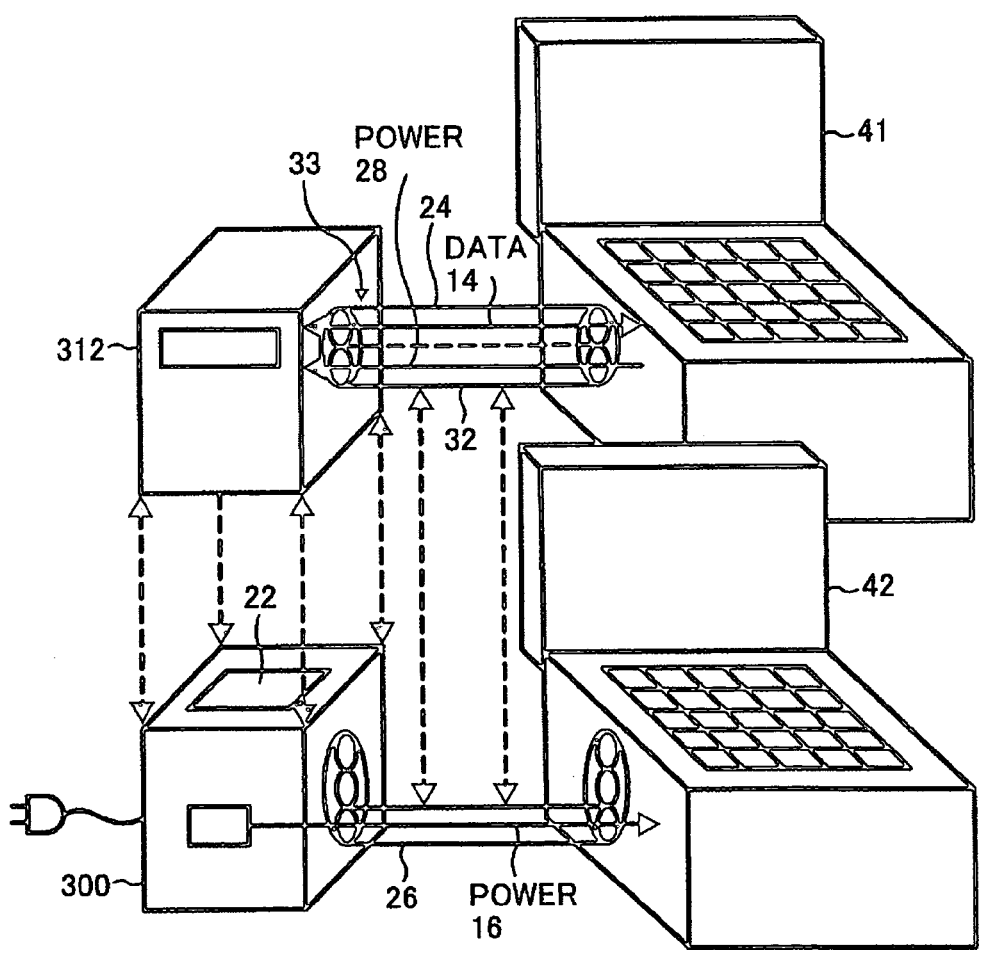
FIG. 11 illustrates an oblique perspective schematic view of a compact computer system in which two computers are used according to a sixth exemplary embodiment.

FIG. 11 illustrates an oblique perspective schematic view of a compact computer system which uses two computers 41 and 42, a power unit 300, a peripheral unit 312 and the pipes 24, 26 and 32 according to a sixth exemplary embodiment of the present disclosure. The power unit 300 of FIG. 11 includes a peripheral connecting connector 22 through which the peripheral unit 312 is connected to the power unit 300. In FIG. 11, the peripheral unit 312 is separated from the power unit 300.

Initially, a first power pipe 26, a data pipe 24 and a second power pipe 32 are integrated and are included in a cable 33. The first power pipe 26 includes a power supply line 16 which supplies power from the power unit 300 to the computer 42. The data pipe 24 includes a data transmission line 14 which transmits signals between the peripheral connecting connector 22 and the computer 41. The second power pipe 32 includes a power supply line 28 which supplies power from the computer 41 to the peripheral unit 312.

The first power pipe 26, the data pipe 24 and the second power pipe 32 are configured to be detached from the cable 33. In FIG. 11, the first power pipe 26 is separated from the data pipe 24 and the second power pipe 32. The power unit 300 is connected to the computer 42 by the first power pipe 26 which is separated from the cable 33. The peripheral unit 312 is connected to the computer 41 by the data pipe 24 and the second power pipe 32. The computer 41 supplies power to the peripheral unit 312 and communicates with the peripheral unit 312.

FIGS. 12A to 13B illustrate oblique perspective schematic views of compact computer systems having computers 84 and 94, power adapters 88 and 98, peripheral units 12 and cables 86 and 96, respectively, according to a seventh exemplary embodiment of the present disclosure. In the first to sixth embodiments, the lines in the cable are physically separated and are used as the power supply lines and as the data transmission line, respectively. However, in the seventh exemplary embodiment, a power signal and a data signal will be multiplexed and demultiplexed so as to be transferred through one line.

FIG. 12A illustrates the power adapter 88 and the cable 86. The power adapter 88 includes the peripheral unit 12 and a power unit 80 having a multiplexing-demultiplexing circuit 46. The multiplexing-demultiplexing circuit 46 multiplexes and demultiplexes a power signal from the power unit 80 to the computer 84 with a data signal between the peripheral unit 12 and the computer 84. Namely, the multiplexing-demultiplexing circuit 46 multiplexes and demultiplexes the power signal from a power supply circuit 21 arranged in the power unit 80 with the data signal. As a result, it is possible to supply power from the power adapter 88 to the computer 84 and to transfer the data signal between the computer 84 and the peripheral unit 12.

FIG. 12B illustrates the computer 84 and the cable 86. The computer 84 includes a multiplexing-demultiplexing circuit 48 which multiplexes and demultiplexes a power signal from the power unit 80 to the computer 84 with a data signal between the peripheral unit 12 and the computer 84. Namely, the multiplexing-demultiplexing circuit 48 multiplexes and demultiplexes the power signal to a main power supply circuit 23 with the data signal. As a result, it is possible to supply power from the power adapter 88 to the computer 84 and to transfer the data signal between the computer 84 and the peripheral unit 12. The power adapter 88 of FIG. 12A and the computer 84 of FIG. 12B perform complementary functions at the respective sides and work as a pair of equipments.

Figure 13A:
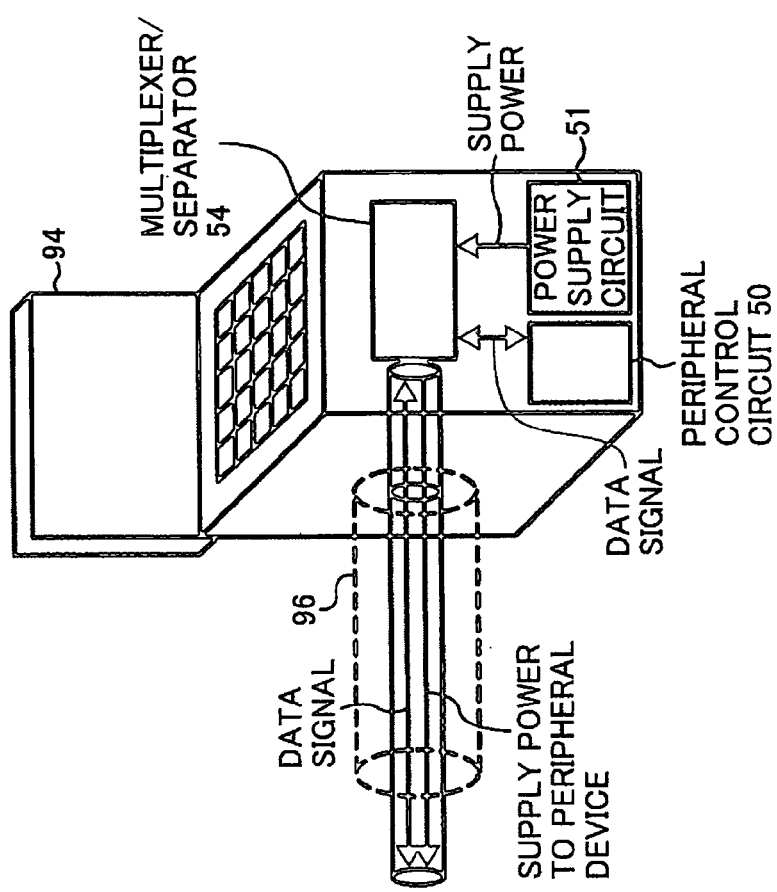
FIG. 13A illustrates schematically a power adapter which includes another multiplexing-demultiplexing circuit.

FIG. 13A illustrates the power adapter 98 and the cable 96. The power adapter 98 includes a peripheral unit 12 and a power unit 90 having a multiplexing-demultiplexing circuit 52. The multiplexing-demultiplexing circuit 52 multiplexes and demultiplexes a power signal from the computer 94 to the peripheral unit 12 with a data signal between the peripheral unit 12 and the computer 94. As a result, it is possible to supply power from the computer 94 to the peripheral unit 12 and to transfer data between the computer 94 and the peripheral unit 12.

Figure 13B:
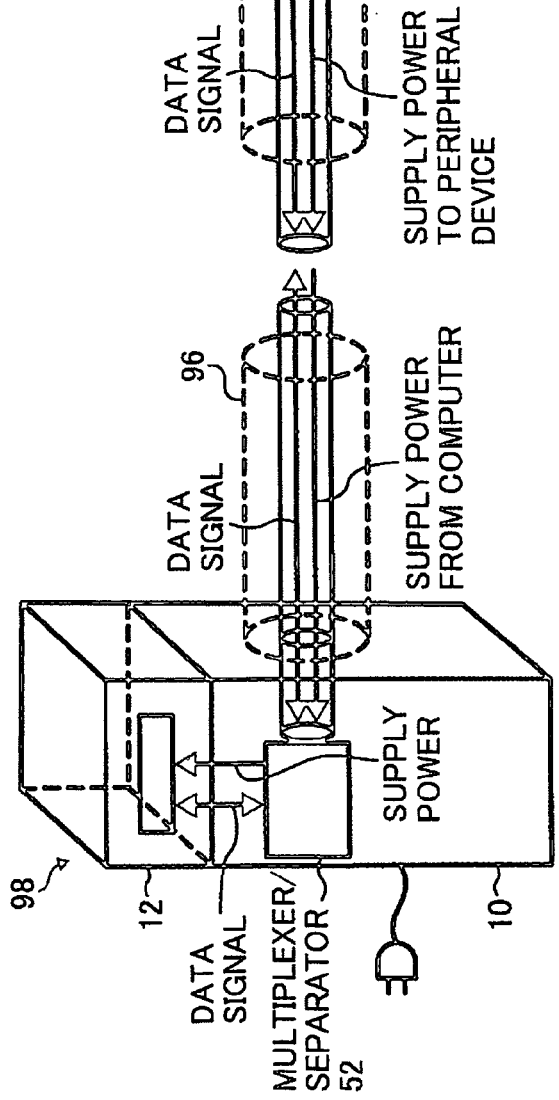
FIG. 13B illustrates schematically a computer which includes another multiplexing-demultiplexing circuit.

FIG. 13B illustrates the computer 94 and the cable 96. The computer 94 includes a multiplexing-demultiplexing circuit 54 which multiplexes and demultiplexes a power signal from a power supply circuit 51 to the peripheral unit 12 with a data signal between the peripheral unit 12 and the computer 94. As a result, it is possible to supply power from the computer 94 to the peripheral unit 12 and to transfer data between the computer 94 and the peripheral unit 12. The power adapter 98 of FIG. 13A and the computer 94 of FIG. 13B perform complementary functions at the respective sides and work as a pair of equipments.

FIG. 14 illustrates schematically an example of a compact computer system based on the combination of the power adapters of FIGS. 12A and 13A and the computers of FIGS. 12B and 13B. Computer 404 supplies DC power to peripheral unit 412 arranged in power adapter 408. The peripheral unit 412 and the computer 404 communicate with data signals A and B.

The peripheral unit 412 includes first and second processing circuits 62 and 64. The first and the second processing circuit 62 and 64 process the data signals A and B, respectively. Further, the peripheral unit 412 includes a power circuit 56 which inputs DC power supplied from the computer 404.

The power unit 410 includes a power supply circuit 21 which supplies DC power to the computer 404. Further, the power unit 410 includes first and second multiplexing-demultiplexing circuit 52 and 46. The first multiplexing-demultiplexing circuit 52 multiplexes and demultiplexes a DC power signal from the computer 404 to the peripheral unit 412 with the data signal A. The second multiplexing-demultiplexing circuit 46 multiplexes and demultiplexes a DC power signal from the power unit 410 to the computer 404 with the data signal B.

The computer 404 includes a power circuit 23 and a power supply circuit 51. A DC power from the power adapter 408 is input to the power circuit 23. The power supply circuit 51 supplies DC power to the peripheral unit 412 arranged in the power adapter 408.

Further, the computer 404 includes third and fourth processing circuits 58 and 60. The third and fourth processing circuits 58 and 60 process the data signals A and B, respectively, during data transmission to the peripheral unit 412. Furthermore, the computer 404 includes third and fourth multiplexing-demultiplexing circuits 54 and 48. The third multiplexing-demultiplexing circuit 54 multiplexes and demultiplexes a DC power signal from the computer 404 to the peripheral unit 412 with a data signal A. The fourth multiplexing-demultiplexing circuit 48 multiplexes and demultiplexes a DC power signal from the power unit 410 to the computer 404 with a data signal B.

The first to fourth multiplexing-demultiplexing circuits 52, 46, 54 and 48 include inductors 52i, 46i, 54i and 48i and capacitors 52c, 46c, 54c and 48c as shown in FIG. 14. The inductor 52i, 46i, 54i and 48i multiplexes and demultiplexes a DC power signals from the power adapter 408 to the computer 404 and a DC power signals from the computer 404 to the peripheral unit 412 with the data signals A and B.

The capacitor 52c, 46c, 54c and 48c multiplexes and demultiplexes the data signals A and B having a predetermined frequency with the DC power signal from the power adapter 408 to the computer 404 and the DC power signal from the computer 404 to the peripheral unit 412.

The operation of the power adapter 408 and the computer 404 will be described. At the first multiplexing-demultiplexing circuit 52, the power unit 410 multiplexes the DC power signal to the peripheral unit 412 through the inductor 52i with the data signal A through the capacitor 52c. The DC power signal is output from the power circuit 51 arranged in the computer 404. The data signal A is output from the peripheral unit 412.

At the second multiplexing-demultiplexing circuit 46, the power unit 410 multiplexes the DC power signal to the computer 404 through the inductor 46i with the data signal B through the capacitor 46c. The DC power signal is output from the power circuit 21 arranged in the power unit 410. The data signal B is output from the peripheral unit 412.

It is possible to output a multiplexed power signal to the peripheral unit 412 with the data signal A to the computer 404 through the cable 406. Further, it is possible to output a multiplexed power signal to the computer 404 with the data signal B through the cable 406.

At the first multiplexing-demultiplexing circuit 52, the power unit 410 demultiplexes the DC power signal to the peripheral unit 412 through the inductor 52i with the data signal A through the capacitor 52c. The DC power signal is output from the power circuit 51 arranged in the computer 404. The data signal A is output from the computer 404.

At the second multiplexing-demultiplexing circuit 46, the power unit 410 demultiplexes the DC power signal to the computer 404 through the inductor 46i with the data signal B through the capacitor 46c. The DC power signal is output from the power circuit 21 located in the power unit 410. The data signal B is output from the computer 404.

It is possible to input signals, the demultiplexed power signal to the peripheral unit 412, the demultiplexed data signal A and the demultiplexed data signal B to the peripheral unit 412.

At the third multiplexing-demultiplexing circuit 54, the computer 404 multiplexes the DC power signal to the peripheral unit 412 through the inductor 54i with the data signal A through the capacitor 54c. The DC power signal is output from the power circuit 51 arranged in the computer 404. The data signal A is output from the computer 404.

At the fourth multiplexing-demultiplexing circuit 48, the computer 404 multiplexes the DC power signal to the computer 404 through the inductor 48i with the data signal B through the capacitor 48c. The DC power signal is output from the power circuit 21 arranged in the power unit 410. The data signal B is output from the computer 404.

It is possible to output a multiplexed power signal to the peripheral unit 412 with the data signal A to the peripheral unit 412 through the cable 406. Further, it is possible to output a multiplexed power signal to the peripheral unit 412 with the data signal B.

At the third multiplexing-demultiplexing circuit 54, the computer 404 demultiplexes the DC power signal to the peripheral unit 412 through the inductor 54i with the data signal A through the capacitor 54c. The DC power signal is output from the power circuit 51 arranged in the computer 404. The data signal A is output from the peripheral unit 412.

At the fourth multiplexing-demultiplexing circuit 48, the computer 404 demultiplexes the DC power signal to the computer 404 through the inductor 48i with the data signal B through the capacitor 48c. The DC power signal is output from the power circuit 21 arranged in the power unit 410. The data signal B is output from the peripheral unit 412.

It is possible to input the power signal to the computer 404 to the power circuit 23 and to input the demultiplexed data signals A and B to the third and fourth processing circuits 58 and 60.

The power is successfully supplied from the power adapter 408 to the computer 404 by multiplexing the data signal A with the power signal to the peripheral unit 412 and the data signal B with the power signal to the computer 404. Further, the power is successfully supplied from the computer 404 to the peripheral unit 412. As a result, the computer 404 and the peripheral unit 412 can perform a data transformation successfully with the data signals A and B.

Figure 15:
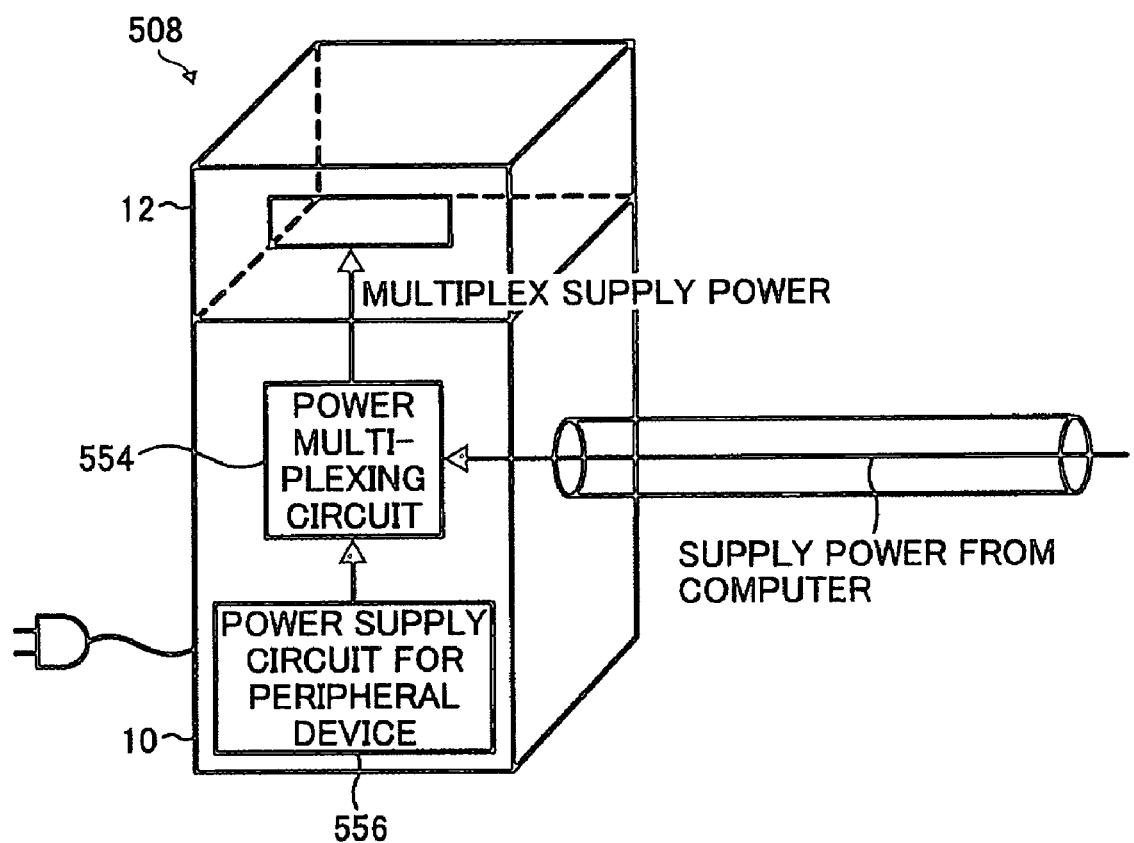
FIG. 15 illustrates an oblique perspective schematic view of a power adapter according to a seventh exemplary embodiment.

FIG. 15 illustrates an oblique perspective schematic view of another example of the power adapter 508 according to the seventh exemplary embodiment of the present disclosure. The power adapter 508 of FIG. 15 includes a power multiplexing circuit 554. The power multiplexing circuit 554 multiplexes a power signal to the peripheral unit 12 arranged in the power adapter 508 from a peripheral power supply circuit (not shown) arranged in the computer 4 with a power signal to the peripheral unit 12 from a peripheral power supply circuit 556 arranged in the power unit 510.

If one of the peripheral power supply circuits becomes unstable, the other peripheral power supply circuit may supply a necessary power to the peripheral unit 12 so as to maintain the power to the peripheral unit 12 stably.

Figure 16:
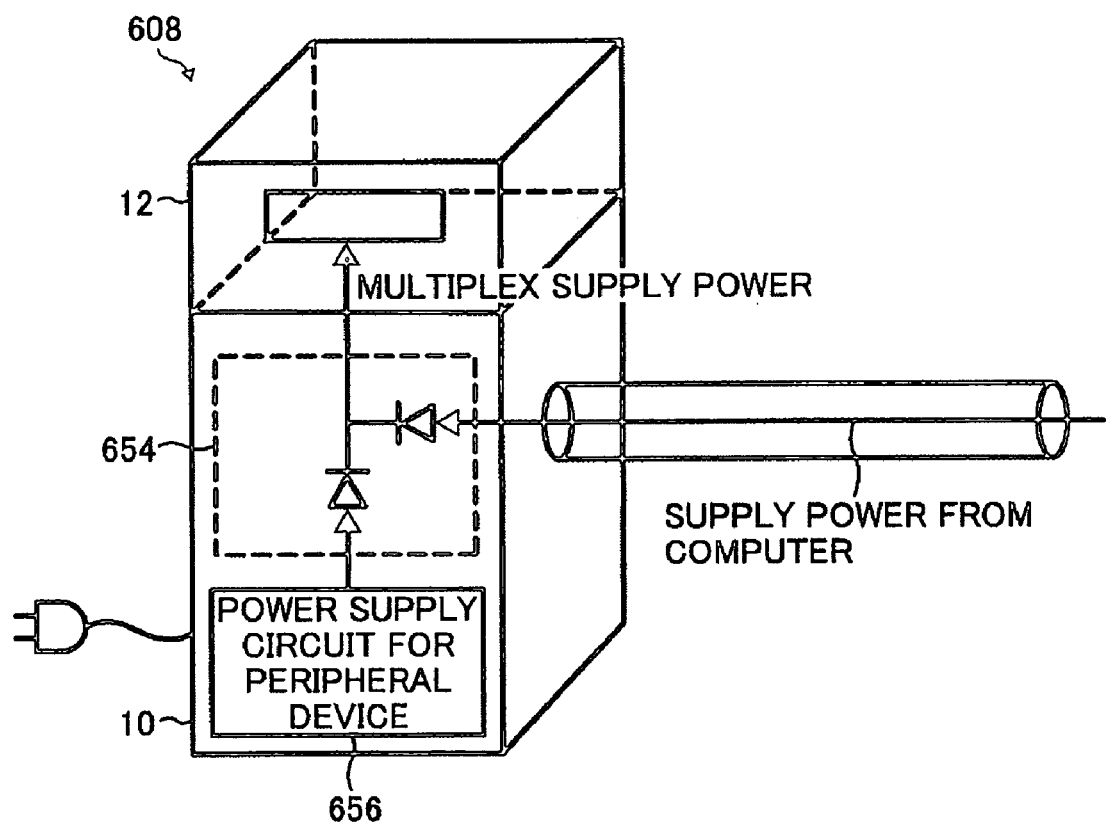
FIG. 16 illustrates an oblique perspective schematic view of another example of a power adapter according to the seventh exemplary embodiment showing a more detailed configuration.

FIG. 16 illustrates an oblique perspective schematic view of another example of the power adapter 608 according to the seventh exemplary embodiment of the present disclosure, showing a more detailed configuration. The power adapter 608 of FIG. 16 includes a power multiplexing circuit 654. The power multiplexing circuit 654 multiplexes a power signal to the peripheral unit 12 arranged in the power adapter 608 from a peripheral power supply circuit (not shown) arranged in the computer 4 with a power signal to the peripheral unit 12 from a peripheral power supply circuit 556 arranged in the power unit 610.

The power multiplexing circuit 654 includes two diodes. All cathodes of the diodes are connected together so that necessary power is supplied. A power supply line from a power supply circuit 656 arranged in the power unit 610 to the peripheral unit 12 and a power supply line from the computer 4 to the peripheral unit 12 are connected to the anodes of the diodes, respectively. Then, the power is appropriately supplied to the peripheral unit 12.

If a plurality of power sources are connected to the anodes and even if one of the power sources is reduced to less than a predetermined value, the sufficient power may be supplied from the other power source. Further, if a total of the power sources satisfies a predetermined value and even if all the power sources do not have enough power to a predetermined value, a sufficient power may be supplied. The above discussion of the seventh exemplary embodiment is also applicable to the fifth exemplary embodiment.

Numerous additional modifications and variations are possible in light of the above teachings. It is therefore to be understood that within the scope of the appended claims, the disclosure of this patent specification may be practiced otherwise than as specifically described herein. For example, elements and/or features of different illustrative embodiments and examples may be combined with each other and/or substituted for each other within the scope of this disclosure and appended claims.

This patent specification is based on Japanese patent application, No. 2005-272066 filed on Sep. 20, 2005 in the Japan Patent Office, the entire contents of which are incorporated by reference herein.

What is claimed is:

1. A power adapter, comprising:
    a power unit including a converter to supply first power to a computer; and
    a peripheral unit configured to communicate with the computer, to be controlled by the computer, and to receive second power from, and controlled by, the computer.

2. The power adapter of claim 1, wherein the converter further supplies power to the peripheral unit.

3. The power adapter of claim 1, further comprising: a connecter arranged at the power unit and configured to connect the converter to the peripheral unit.

4. The power adapter of claim 3, wherein the peripheral unit is detachably attached to the power unit with the connecter.

5. The power adapter of claim 1, further comprising:
    a cable including a power line and a transmission line.

6. The power adapter of claim 5, wherein the cable is detachably attached to the power adapter.

7. The power adapter of claim 1, further comprising:
    a multiplexing-demultiplexing circuit configured to multiplex and demultiplex the first power and the second power with a data or control signal.

8. The power adapter of claim 7, wherein the multiplexing-demultiplexing circuit multiplexes and demultiplexes the first power to the computer with a data signal to the computer or a data signal to the peripheral unit controlled by the computer.

9. The power adapter of claim 7, wherein the multiplexing-demultiplexing circuit multiplexes and demultiplexes the second power to the peripheral unit supplied from the computer with a data signal to the computer or a data signal to the peripheral unit controlled by the computer.

10. The power adapter of claim 1, further comprising:
    a multiplexing circuit arranged in the power adapter and configured to multiplex the second power to the peripheral unit from the computer with a power to the peripheral unit from the power unit.

11. The power adapter of claim 1, wherein the second power supplied to the peripheral unit from and controlled by the computer is different from the first power from the power unit.

12. A computer system, comprising:
    a computer;
    a power adapter which includes a power unit configured to supply first power to the computer, and a peripheral unit configured to communicate with the computer, to be controlled by the computer, and to receive second power from, and controlled by, the computer; and
    a cable including a power line to supply power and a transmission line to transmit data.

13. The computer system of claim 12, wherein the power adapter further includes a multiplexing-demultiplexing circuit configured to multiplex and demultiplex the first power and the second power with the data or control signal.

14. The computer system of claim 13, wherein the multiplexing-demultiplexing circuit multiplexes and demultiplexes the first power to the computer with the data or control signal to the peripheral unit from the computer.

15. The computer system of claim 13, wherein the multiplexing-demultiplexing circuit multiplexes and demultiplexes the second power to the peripheral unit supplied from the computer with a data signal to the computer and a data signal to the peripheral unit controlled by the computer.

* * * * *